United States Patent
Ertz et al.

(10) Patent No.: US 12,047,017 B2
(45) Date of Patent: Jul. 23, 2024

(54) ULTRASONIC VIBRATION DEVICE HAVING A FIRST AND A SECOND PIEZO SENSOR

(71) Applicant: Herrmann Ultraschalltechnik Gmbh & Co. KG, Karlsbad (DE)

(72) Inventors: Gabriel Ertz, Hannover (DE); Jens Twiefel, Hannover (DE); Jorg Wallaschek, Hannover (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 796 days.

(21) Appl. No.: 17/264,836

(22) PCT Filed: Aug. 8, 2019

(86) PCT No.: PCT/EP2019/071297
§ 371 (c)(1),
(2) Date: Jan. 31, 2021

(87) PCT Pub. No.: WO2020/035384
PCT Pub. Date: Feb. 20, 2020

(65) Prior Publication Data
US 2021/0297012 A1    Sep. 23, 2021

(30) Foreign Application Priority Data
Aug. 17, 2018   (DE) .................... 10 2018 120 124.9

(51) Int. Cl.
*H02N 2/00* (2006.01)
*B06B 1/06* (2006.01)
(Continued)

(52) U.S. Cl.
CPC ........... *H02N 2/001* (2013.01); *B06B 1/0611* (2013.01); *B23K 20/10* (2013.01); *G01H 11/08* (2013.01); *H02N 2/0075* (2013.01)

(58) Field of Classification Search
CPC .... H02N 2/001; H02N 2/0075; B06B 1/0611; B23K 20/10; G01H 11/08
(Continued)

(56) References Cited

U.S. PATENT DOCUMENTS 6,279,810 B1   8/2001   Chan-Wong et al.
6,286,747 B1   9/2001   Chan et al.
(Continued)

FOREIGN PATENT DOCUMENTS

CN       107990973 A      5/2018
DE       102004026826 A1  1/2006
(Continued)

OTHER PUBLICATIONS

Nora Lindner, The International Bureau of the World Intellectual Property Organization, International Preliminary Report on Patentability, PCT/EP2019/071297, Feb. 23, 2021 (English translation).
(Continued)

*Primary Examiner* — Dedei K Hammond
*Assistant Examiner* — Monica Mata
(74) *Attorney, Agent, or Firm* — PAUL & PAUL

(57) ABSTRACT

An ultrasonic vibration device has a sonotrode and a converter, the converter having a piezoelectric actuator for converting an electrical alternating voltage into a mechanical vibration. A first piezoelectric sensor element outputs a first measurement signal which varies in dependence on the vibration amplitude of the mechanical vibration. To permit measurement of at least one intensive state variable like the temperature, or the aging state of the piezoelectric actuator, a second piezoelectric sensor element outputs a second measurement signal which also varies in dependence on the vibration amplitude of the mechanical vibration. However, the second piezoelectric sensor element differs in a physical property from the first.

11 Claims, 2 Drawing Sheets

Figure 1:
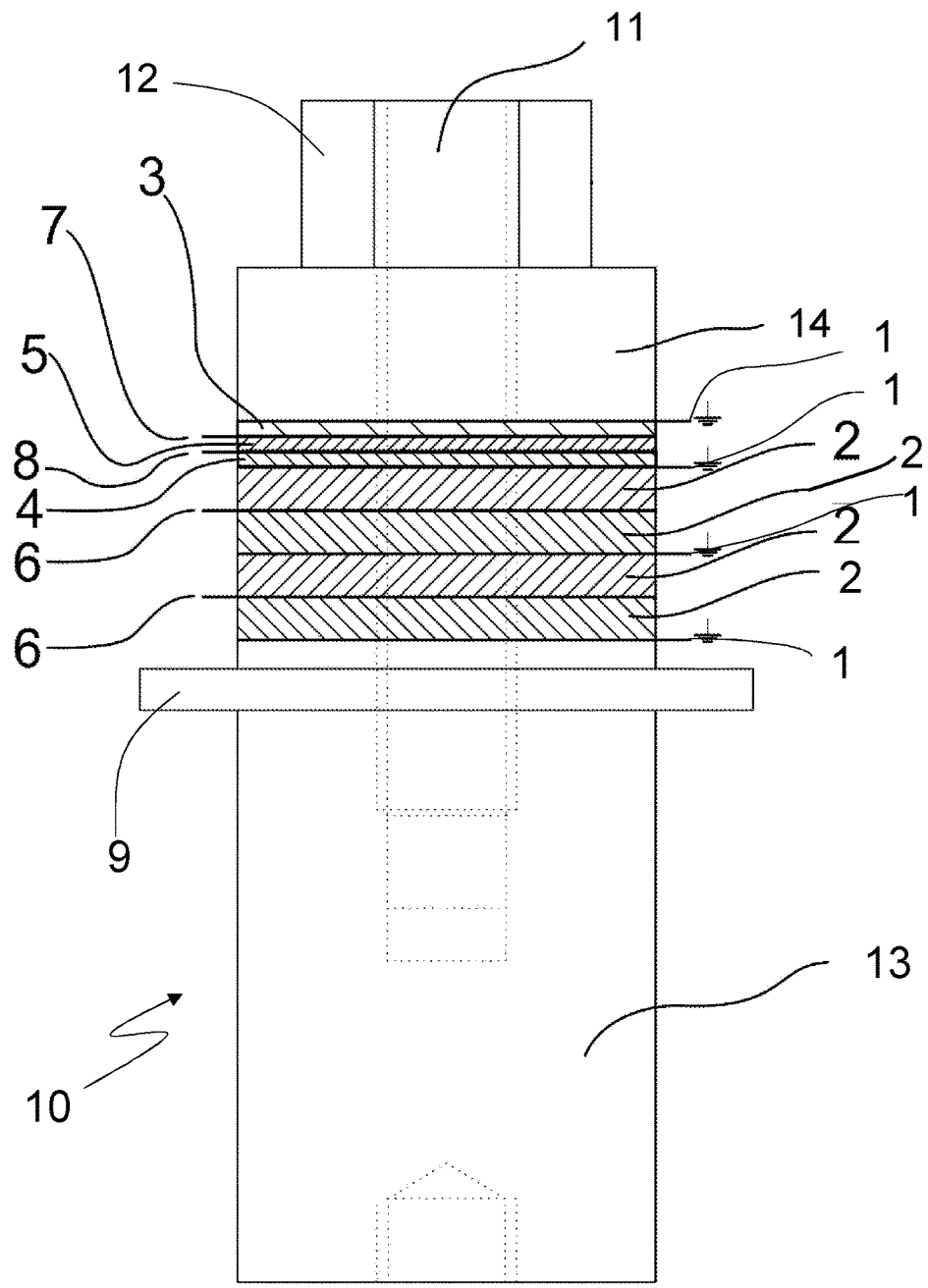

(51) Int. Cl.
*B23K 20/10* (2006.01)
*G01H 11/08* (2006.01)

(58) Field of Classification Search
USPC .......................................................... 310/336
See application file for complete search history.

(56) References Cited

U.S. PATENT DOCUMENTS

| 7,611,039 | B2 | 11/2009 | Hesse et al. |
| 7,647,828 | B2 | 1/2010 | Gassert |
| 10,608,160 | B2 | 3/2020 | Fehrenbach et al. |
| 2007/0152021 | A1 | 7/2007 | Hesse et al. |
| 2007/0271025 | A1 | 11/2007 | Yasui et al. |
| 2009/0013786 | A1 | 1/2009 | Gassert |
| 2012/0279742 | A1* | 11/2012 | Roser .................. B25F 5/00 173/176 |
| 2015/0002586 | A1 | 1/2015 | Sumi et al. |
| 2020/0036302 | A1* | 1/2020 | Saito ...................... H02N 2/103 |

FOREIGN PATENT DOCUMENTS

| DE | 102004045575 | A1 | 4/2006 |
| EP | 2288301 | B1 | 12/2016 |
| JP | H07163 163 | A | 6/1995 |
| JP | 2003126967 | A | 5/2003 |
| JP | 2005146988 | A | 6/2005 |
| JP | 2008500904 | A | 1/2008 |
| JP | 20085 13217 | A | 5/2008 |
| JP | 2013161955 | A | 8/2013 |
| KR | 20160096935 | A | 8/2016 |
| WO | 2016126041 | A1 | 8/2016 |

OTHER PUBLICATIONS

Office Action, dated May 13, 2022, Japanese Patent Application No. JP 2021-53 25 18 (and English Translation of Office Action).
China National Intellectual Property Administration, Office Action, Dated Nov. 3, 2022, Chinese Patent Application No. 201980052019.1 (and English Translation).
European Patent Office, Office Action, Dated Mar. 9, 2022, EP Application No. 19 755 309.2.

* cited by examiner

ULTRASONIC VIBRATION DEVICE HAVING A FIRST AND A SECOND PIEZO SENSOR

CROSS-REFERENCE TO RELATED APPLICATIONS

This application is a 371 national stage application of International Application PCT/EP2019/071297, filed Aug. 8, 2019, and claims the priority of German Application No. 10 2018 120 124.9, filed on Aug. 17, 2018.

The invention concerns an ultrasonic vibration device having a sonotrode and a converter, wherein the converter has a piezoelectric actuator for converting an electrical alternating voltage into a mechanical vibration.

Such ultrasonic vibration devices are known. An electrical alternating voltage which is generally provided by a generator is applied to the piezoelectric actuator which converts the alternating voltage into a mechanical vibration. The sonotrode is fixed to the converter, with an amplitude transformer often being interposed. The electrical alternating voltage is so selected that a standing wave is formed in the overall ultrasonic vibration device comprising the converter, the sonotrode and possibly an amplitude transformer.

Frequently the sonotrode has a welding surface or a sealing surface which comes into contact with a material to be processed. When the ultrasonic vibration device vibrates a high-frequency vibration is transmitted to the material by way of the welding surface or the sealing surface.

The most widely varying materials, in particular plastics and non-wovens, can be processed with such ultrasonic vibration devices. In most cases the converter is equipped with an even number of piezoelectric elements which operate as piezoelectric actuators and have at least an upper portion and a lower portion which are braced by means of a double screw. The piezoelectric actuators mostly comprise ceramics and can be produced in the most widely varying forms using a sintering method. A ceramic which is frequently used is lead-zirconate-titanate (PZT) which has dielectric, piezoelectric, pyroelectric and ferroelectric properties. The piezoelectric actuators convert the electrical high-frequency signal (typically 20 to 100 kHz) into a mechanical deformation and thus produce a movement which is propagated through the entire ultrasonic vibration unit.

The vibration amplitude of the movement produced is crucial for the processing operation. That vibration amplitude has an influence on process quality, process speed and the service life of the ultrasonic vibrator.

In practice however piezoelectric actuators exhibit a temperature-dependent behaviour, that is to say they vary their properties in dependence on temperature. Temperature variations however are not to be completely avoided, especially as the piezoelectric ceramic used itself does not represent an ideal converter and a part of the electrical energy supplied is converted into heat instead of into mechanical vibration energy. A variation in temperature therefore causes a variation in the vibration amplitude which is essential for the processing procedure.

In order to be able to carry out the processing procedure as much as possible with a constant quality therefore in many situations of use the vibration amplitude is already measured and subjected to closed-loop control by adaptation of the amplitude of the applied alternating voltage. That can be effected for example by means of strain gauges mounted at the outside of the ultrasonic vibration unit.

DE 10 2004 026 826 A1 also proposes measuring the vibration amplitude of the ultrasonic vibration system. Measurement by means of a first piezoelectric sensor element is referred to as an example. That first piezoelectric sensor element outputs a first measurement signal which varies in dependence on the vibration amplitude of the mechanical vibration.

Basically in that case the piezoelectric actuator is an active element which converts an electrical alternating voltage into a mechanical vibration while the first piezoelectric sensor element is a passive element which converts a deformation of the piezoelectric sensor element into a charge separation in the piezoelectric element, which in turn can be detected. In that respect the magnitude of the charge separation is a measurement in respect of the deformation of the piezoelectric sensor element.

In that structure however it is only the vibration amplitude of the mechanical vibrations that can be determined and reacted thereto.

In actual fact the changes in the physical properties of the piezoelectric ceramic which are caused by virtue of a change in temperature are not completely reversible. An excessive increase in temperature of the piezoelectric ceramic can therefore lead to partial destruction of the ceramic, which cannot be prevented by the known vibration amplitude measurements.

Furthermore the commercially usual piezoelectric ceramics exhibit ageing effects. The capability of the piezoelectric ceramics to convert an electrical high-frequency signal into a mechanical deformation decreases with the passage of time. That can be compensated by the described measurement method within certain limits by increasing the amplitude of the alternating voltage. It will be noted however that with progressive ageing at some time the time is reached at which the required vibration amplitude can no longer be reliably produced with the piezoelectric actuator.

In addition the change in other intensive state variables can cause a variation in the vibration amplitude produced by the piezoelectric actuator. The term intensive state variable is used to denote a state variable which does not change upon a variation in the size of the system being considered. Besides temperature and the ageing state examples of intensive state variables are for example also pressure.

Taking the described state of the art as the basic starting point therefore the object of the present invention is to provide an ultrasonic vibration device which allows the measurement of at least one intensive state variable like for example the temperature or the ageing state of the piezoelectric actuator.

According to the invention that object is attained by a second piezoelectric sensor element which outputs a second measurement signal which varies in dependence on the vibration amplitude of the mechanical vibration, wherein the first and second piezoelectric sensor elements differ in a physical property so that the first and the second measurement signal exhibit a different dependency on an intensive state variable.

Accordingly a variation in the intensive state variable can be detected in a simple fashion by the ultrasonic vibration device according to the invention as a variation in the intensive state variable has a differing effect on the first and the second measurement signal.

By way of example the first piezoelectric sensor element could comprise a pyroelectric material while the second piezoelectric sensor element is only weakly or not at all pyroelectric. While the first piezoelectric sensor element, by virtue of its pyroelectric properties, exhibits a dependency on the state variable temperature, that is to say the first measurement signal is markedly influenced by temperature, the second piezoelectric sensor element exhibits only a slight or no temperature dependency so that the second measurement signal remains almost uninfluenced by temperature changes.

In a preferred embodiment of the invention there is provided a comparison device which compares the first measurement signal to the second measurement signal. By means of the comparison it is now possible to establish whether a change in the measurement signal occurs caused by temperature.

Both measurement signals primarily exhibit a vibration behaviour which by virtue of the piezoelectric properties of the piezoelectric sensor elements, is caused by the mechanical vibrations produced in the ultrasonic vibration device. They however act on the two piezoelectric sensor elements in the same way. If, at a given temperature, the two piezoelectric sensor elements have the same deformation with the same polarisation caused by the alternating voltage then it is possible to form the difference between the two measurement signals. At the given temperature the difference is then ideally zero. Possibly the measurement signals are to be weighted at normal temperature so that the difference gives zero.

If during the processing operation there is an increase in the temperature of the ultrasonic vibration device and therewith also the converter and the associated piezoelectric actuator that leads to a difference of non-zero by virtue of the different dependency of the two measurement signals on the temperature. It is thus possible to conclude there is a variation in temperature by virtue of the difference.

If that difference exceeds a predetermined value then measures can be taken to prevent damage to the piezoelectric actuator. For example the generator driving the converter can be shut down or a cooling device can be activated to cool the converter.

In a further preferred embodiment the first piezoelectric sensor element and the second piezoelectric sensor element have crystals with different mean crystallite sizes.

The ageing condition is also an intensive state variable. Particularly when dealing with ferroelectric materials ageing processes have a severe effect by virtue of the complex atomic lattice structure so that here depolarization effects, ageing effects and material fatigue occur. Non-ferroelectric piezoelectric materials are less susceptible to those ageing processes with their relatively simple atomic lattices. Consequently substances with larger crystallites or monocrystals are less susceptible to ageing processes so that conclusions about the extent of ageing are drawn by a comparative measurement at a piezoelectric sensor element with ageing effects and a piezoelectric sensor element with no or less pronounced ageing effects.

In that respect a particularly preferred embodiment is one in which the one piezoelectric sensor element is a polycrystal while the other piezoelectric sensor element is monocrystal.

If the first piezoelectric sensor element is made from the same material as the piezoelectric actuator however ageing of the first piezoelectric sensor element is a measurement in respect of ageing of the piezoelectric actuator.

In a preferred embodiment the piezoelectric sensor elements are arranged in the converter. In that case an arrangement as close as possible to the piezoelectric actuator is of advantage. Particularly when the temperature of the piezoelectric actuator is to be detected it is advantageous if the piezoelectric sensor element whose measurement signal shows the higher temperature dependency is arranged closer to the piezoelectric actuator than the other piezoelectric sensor element. If for example the second piezoelectric sensor element has a quartz while the first piezoelectric sensor element comprises PZT it is advantageous if the first piezoelectric sensor element is arranged closer to the piezoelectric actuator than the second piezoelectric sensor element.

In addition the physical properties of the piezoelectric actuator and one of the two piezoelectric sensor elements should be very similar. It is therefore particularly preferred if the first piezoelectric sensor element comprises the same material as the piezoelectric actuator.

Particularly in ultrasonic vibration systems as are being considered here the longitudinal effect (d33 direction) is frequently utilised in the piezoelectric actuator. It is therefore advantageous if piezoelectric actuator and the piezoelectric sensors are arranged in mutually juxtaposed relationship in the longitudinal direction. The thickness of the piezoelectric actuator in the longitudinal direction is substantially determined by the required vibration amplitude of the mechanical vibration. The thickness of the piezoelectric sensor elements in contrast can be markedly less. That reduces the costs of the piezoelectric sensor element.

To determine the variation in an intensive state variable therefore the first measurement signal and the second measurement signal are detected. The two detected measurement signals are subtracted from each other, that is to say the difference is formed. In that respect it is necessary under some circumstances to multiply at least one of the two measurement signals by a weighting factor before the difference is formed. That weighting factor can also be 1. The difference determined in that way is then a measurement in respect of the variation in the intensive state variable.

Figure 2:
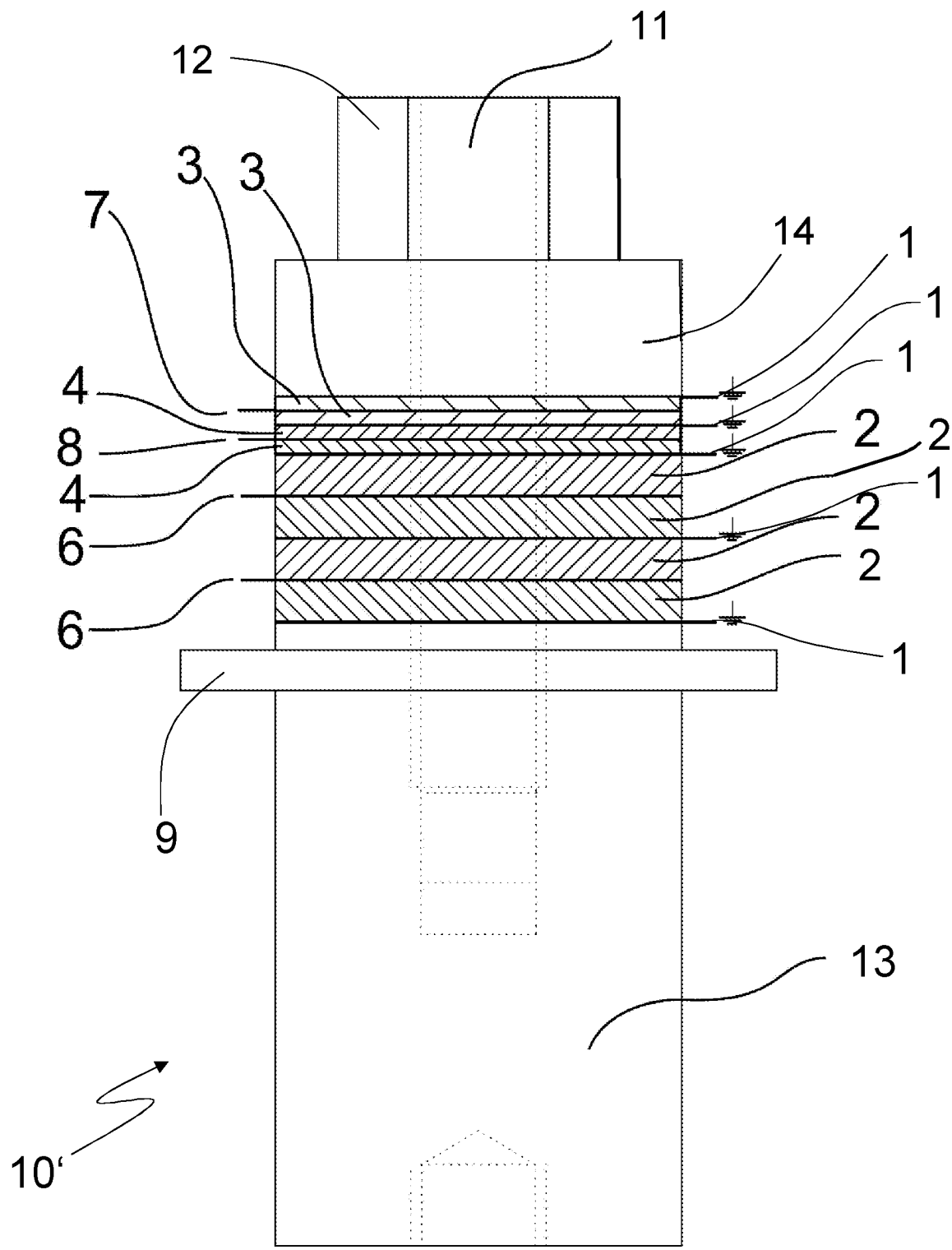

Further advantages, features and possible uses of the present invention will be apparent from the description hereinafter of a preferred embodiment. In the drawing:

FIG. 1 shows a first embodiment of a converter of an ultrasonic vibration device according to the invention, and FIG. 2 shows a second embodiment of a converter of an ultrasonic vibration device according to the invention.

FIGS. 1 and 2 show two different variants of a converter 10 and 10' respectively. The converter can be connected to a sonotrode, optionally by way an amplitude transformer.

For the sake of simplicity only the converter is shown here. Coupling of the converter to the sonotrode or the amplitude transformer however is generally known and is not subject-matter of the present invention.

The converter 10 and 10' respectively has main body elements 13 and 14, between which the piezoelectric actuator 2 and the piezoelectric sensor elements 3, 4 are disposed. Fixing is effected by means of the threaded rod 11 and the fixing nut 12. The lower main body element 13 has a holding flange 9 on which the converter can be held.

The piezoelectric actuator comprises two pairs of piezoelectric discs 2. Each pair is connected at its outside surfaces to a respective ground electrode 1. The mutually facing surfaces of each pair are connected to a + electrode 6, by way of which the actuator can be controlled. By means of the piezoelectric actuator, a mechanical vibration is generated in the converter and thus also in the connected elements, namely the sonotrode and possibly the amplitude transformer. For that purpose a generator (not shown) is connected to the piezoelectric actuator by way of the + electrodes. The generator delivers an electrical alternating voltage which is converted into a mechanical vibration by the piezoelectric actuator on the basis of the piezoelectric effect.

The piezoelectric actuator however is not an ideal converter, that is to say losses occur during operation, that lead to an increase in temperature of the piezoelectric actuator. The piezoelectric actuator varies its properties in dependence on temperature. In that respect only a part of the change is also reversible. As soon as the temperature exceeds a given value the piezoelectric actuator suffers irreversible damage. Therefore temperature measurement in the vibration structure is basically desirable in order to provide for efficient monitoring and possibly influence the temperature.

In addition ageing monitoring is desired. Ageing of the piezoelectric elements usually employed in power ultrasonic applications in the piezoelectric actuator is a matter of great interest to compensate for the reduction in the conversion of electrical to mechanical vibration, caused by ageing. With the current estimation methods for determining amplitude a lack of information relating to the ageing state prevents uniformly sufficient quality over the service life of the system.

The present invention is based on the notion that a combination of a plurality of different sensor materials in the converter differs explicitly in the physical property thereof: piezoelectric and pyroelectric to piezoelectric and non-pyroelectric for temperature measurement and monocrystalline and polycrystalline for service life monitoring. The difference in the physical properties also affords a difference in the dependency on an intensive state variable like for example temperature or the ageing state.

The piezoelectric sensors can also be used for amplitude measurement of the ultrasonic vibration, even if that is not absolutely necessary.

The examples shown in the Figures involve combined ageing, temperature and amplitude measurement with two piezoelectric sensor element types, of which the first piezoelectric sensor element 4 is piezoelectric and pyroelectric (and possibly also ferroelectric) and preferably comprises the same material as the piezoelectric actuator, and the second piezoelectric sensor element 3 is only piezoelectric but not pyroelectric.

In the illustrated example the first piezoelectric sensor element 4 comprises PZT and the second sensor element 3 comprises a monocrystal, like for example quartz, which ages substantially more slowly or not at all in comparison with a polycrystalline piezoelectric material like for example PZT.

Both piezoelectric sensor elements are best arranged close to a strain maximum in the vibration structure. That can occur for example in the converter near the piezoelectric actuator, as shown in the Figures. In FIG. 1 the first piezoelectric sensor element 4 is connected on a face to a ground electrode 1. The other face is connected to a measuring electrode 7, by way of which the first measurement signal can be taken off. In the same fashion the second piezoelectric sensor element 3 is connected on a face to a ground electrode 1 and at the other face to a measuring electrode 8. The second measurement signal can be taken off by way of the measuring electrode 8.

The two piezoelectric sensor elements 3, 4 are separated from each other by an insulating layer 5 to separate the two measurement electrodes.

The first piezoelectric sensor element 4 having piezoelectric and pyroelectric properties outputs a first measurement signal by virtue of the piezoelectric effect, which is substantially proportional to the vibration amplitude of the ultrasonic vibrator. In addition a further measurement signal component is output by virtue of the pyrotechnic effect, when the sensor element has an increase in temperature.

The second piezoelectric sensor element 3 which is admittedly piezoelectric but not pyroelectric or is only very weakly pyroelectric is placed near the first sensor element 4 and also outputs a measurement signal substantially proportional to the vibration amplitude of the ultrasonic vibration unit. As a departure from the first piezoelectric sensor element 4 however here a change in temperature does not have a significant influence on the second measurement signal so only a measurement signal proportional to the vibration amplitude of the ultrasonic vibration is output.

Basically it is also possible to omit the insulating element 5. If otherwise nothing is altered in the structure then the two measurement signals occur at the same electrode. If both sensor elements are arranged with the same polarisation then the two measurement sensor signals are subtracted so that the component which is proportional to the vibration amplitude is almost eliminated. Accordingly, only one measurement signal is obtained, which indicates a dependency on temperature. Possibly firstly scaling of the geometrical dimensions of both sensors is necessary so that the signal components caused by the mechanical vibration are also of equal size at both sensors for the same vibrations.

In the described example the second piezoelectric sensor element 3 comprises a monocrystal, for example of quartz, so that the ageing progresses substantially more slowly in this piezoelectric sensor element than in the first piezoelectric sensor element 4 in the piezoelectric actuator. Accordingly by the comparison of the high-frequency measurement signals between the two sensors or between the second piezoelectric sensor element 3 and the piezoelectric actuator it is possible to make an estimate about the ageing or the change in the piezoelectric constant, here in particular the d33 constant, and can possibly be compensated by means of the closed-loop control by way of the generator.

It is also possible as shown in FIG. 2 to dispense with the insulating element and nonetheless to detect two measurement signals separately from each other. In this embodiment both the first and also the second piezoelectric sensor elements 3, 4 each have two piezoelectric discs which are connected to a ground electrode 1 at their faces facing away from each other and are connected at their mutually facing inner faces to a measuring electrode 7, 8, by way of which the measurement signals can be taken off.

LIST OF REFERENCES 1 ground electrode
2 piezoelectric actuator
3 second piezoelectric sensor element
4 first piezoelectric sensor element
5 insulating element
6 (+) electrode
7, 8 measuring electrode
9 holding flange
10, 10' converter
11 threaded rod
12 fixing nut
13, 14 main body element

The invention claimed is:

1. An ultrasonic vibration device having a sonotrode and a converter, wherein the converter has a piezoelectric actuator for converting an electrical alternating voltage into a mechanical vibration, wherein there is provided a first piezoelectric sensor element which outputs a first measurement signal which varies in dependence on a vibration amplitude of the mechanical vibration, wherein there is provided a second piezoelectric sensor element which outputs a second measurement signal which varies in dependence on the vibration amplitude of the mechanical vibration, wherein the second piezoelectric sensor element differs in a physical property from the first piezoelectric sensor element; and a change in an intensive state variable of an element of the ultrasonic vibration device, wherein a difference of the first measurement signal multiplied by a first weighting factor and the second measurement signal multiplied by a second weighting factor is formed and the difference is used as a measure in respect of a variation in the intensive state variable.

2. The ultrasonic vibration device according to claim 1, wherein there is provided a comparison device which compares the first measurement signal to the second measurement signal.

3. The ultrasonic vibration device according to claim 1, wherein the first piezoelectric sensor element and the second piezoelectric sensor element have different pyroelectric properties.

4. The ultrasonic vibration device according to claim 1, wherein the piezoelectric actuator and the first piezoelectric sensor element comprise a same piezoelectric material.

5. The ultrasonic vibration device according to claim 1, wherein the piezoelectric actuator is of a greater extent in a longitudinal direction than the second piezoelectric sensor element.

6. The ultrasonic vibration device according to claim 1, wherein the first piezoelectric sensor element and the second piezoelectric sensor element have crystals with different crystallite sizes.

7. The ultrasonic vibration device according to claim 6, wherein one of the first piezoelectric sensor element and the second piezoelectric sensor element has a piezoelectric monocrystal and another of the first piezoelectric sensor element and the second piezoelectric sensor element has a piezoelectric polycrystal.

8. The ultrasonic vibration device according to claim 1, wherein at least one piezoelectric sensor element is arranged in the converter.

9. The ultrasonic vibration device according to claim 8, wherein the first piezoelectric sensor element and the second piezoelectric sensor element are arranged in the converter.

10. The ultrasonic vibration device according to claim 8, wherein the piezoelectric actuator and the first piezoelectric sensor element and the second piezoelectric sensor element are arranged in mutually juxtaposed relationship.

11. The ultrasonic vibration device according to claim 10, wherein the first piezoelectric sensor element and the second piezoelectric sensor element are arranged in mutually juxtaposed relationship in a longitudinal direction.

* * * * *